United States Patent [19]  [11] 3,962,776
Mikami  [45] June 15, 1976

[54] METHOD OF MAKING AN OIL SEAL
[75] Inventor: Yasuo Mikami, Fujisawa, Japan
[73] Assignee: Nippon Oil Seal Industry Co., Ltd., Tokyo, Japan
[22] Filed: Mar. 11, 1975
[21] Appl. No.: 557,298

[30] Foreign Application Priority Data
Mar. 14, 1974  Japan.............................. 49-29484

[52] U.S. Cl................................. 29/458; 29/469.5; 29/527.2; 72/46; 264/267; 264/271; 277/134
[51] Int. Cl.² ...................................... B23P 11/00
[58] Field of Search................. 29/458, 469.5, 428, 29/527.1, 527.2, 527.3, 527.4; 277/134; 264/259, 267, 271, 294; 72/46

[56] References Cited
UNITED STATES PATENTS
2,982,999  5/1961  Stewart .............................. 425/128
3,090,996  5/1963  Reichenbach et al. ............ 29/527.1
3,490,139  1/1970  McKinven .......................... 29/527.1

Primary Examiner—Willard E. Hoag
Attorney, Agent, or Firm—Holman & Stern

[57] ABSTRACT
A method of producing an oil seal with a wavy lip-line by plastically deforming the flange of the metallic ring of the oilseal.

5 Claims, 7 Drawing Figures

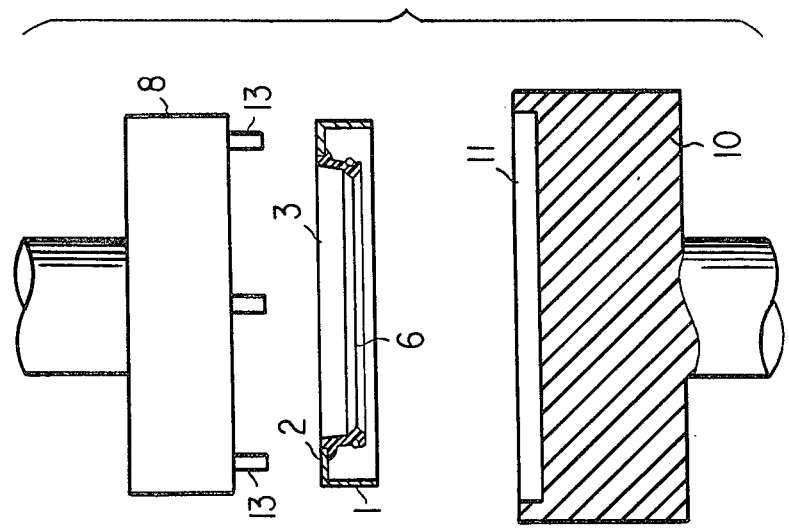
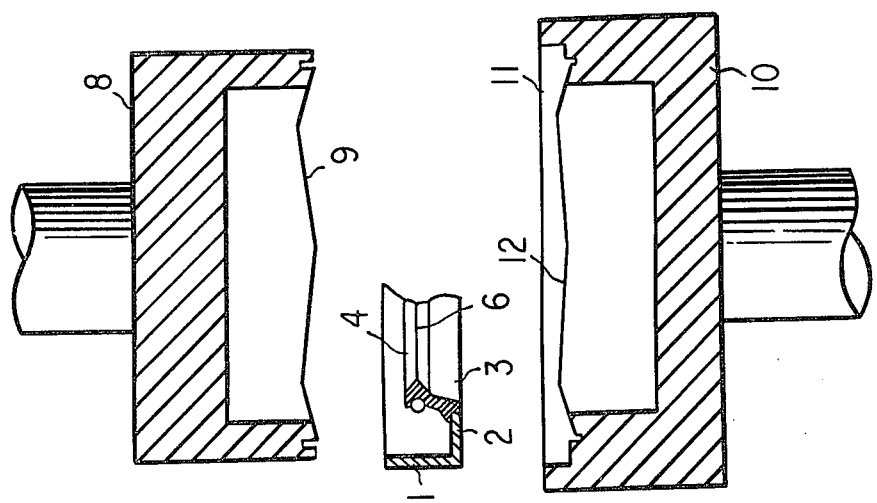

METHOD OF MAKING AN OIL SEAL

BACKGROUND OF THE INVENTION

This invention relates to a method of making an oilseal having a curvature section on its lip line and also a method of producing the oilseal.

Conventionally an oilseal of the above-described type has been produced through the use of a mold core which has a wavy lip line-forming plane to form a wavy lip at the time of vulcanization molding of the oilseal. For this reason, finish work on the lip line after the vulcanization molding is extremely difficult. In order to avoid the necessity of finish work on the lip line, special designing has to be made in advance for the mold core. This results in complication of the construction of the mold core and a requirement for extremely skilled workmanship.

Furthermore, the wavy lip line-forming plane of the mold core necessary to form such a wavy lip line at the time of vulcanization molding of the oilseal requires complex procedural steps. Usually, such a wavy lip line-forming plane is produced by: first, forming a pair of conical planes each of which inclines at the peripheral plane of the mold core in a direction opposite to the other, with a different inclination angle from each other and connecting to the other at a minimum diameter section, then, forming these conical planes into the wavy form.

Shaping of the wavy lip line-forming planes therefore requires high precision work and consequently production of the mold core is extremely difficult. Additionally, since the wavy lip lines of the oilseal are shaped directly by the use of the mold core, an inferior flow of rubbery material tends to occur at the wavy lip line-forming planes. This, in turn, produces defects, for example, blowholes, which cause adverse effects in sealing capability.

SUMMARY OF THE INVENTION

The present invention has as its object to eliminate the drawbacks of the conventional method, and is directed primarily to a method of producing an oilseal which can impart a curvature section to a lip line of the oilseal main body that has already been vulcanization molded, wherein said lip line may have been finish-machined or may not have been finish-machined for those oilseals which do not require such a finish work.

This object is carried out by producing an oilseal comprising a metallic ring with a flange projecting in the direction of the diameter thereof, and an oilseal resilient main body having a lip integrally attached to the edge section of the flange of the ring. A plastically deformed section is mechanically provided in the flange of the metallic ring which imparts a curvature section to the lip line of the resilient main body of the oilseal.

According to the present invention, therefore, plastic deformation of the flange of the metallic ring may be effected only after vulcanization molding of the oilseal resilient main body, or after finish work of the lip line, for the oilseals requiring such finish work. Consequently, the present invention eliminates completely the necessity of high precision work for the production of the mold core and associated jigs and devices that have been required in the conventional methods for forming a wavy lip line simultaneously at the time of vulcanization molding of the oilseal main body, and makes it possible to form a lip line having a curvature section after finish work has been completed. Thus, in accordance with the present invention, an oilseal having a wavy lip line can be produced in an easy manner and the resulting product has an excellent oil sealing capability.

BRIEF DESCRIPTION OF THE DRAWINGS

FIGS. 4 through 6 are schematic illustrations of different types of molds for causing plastic deformation of the metallic ring.

DETAILED DESCRIPTION OF THE INVENTION

Figure 1:
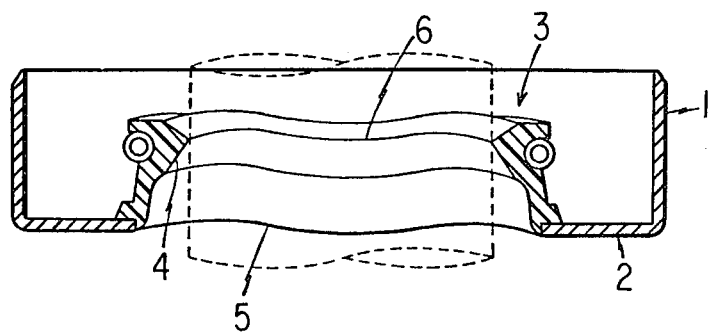
FIG. 1 is a cross-sectional view of an embodiment of an oilseal produced in accordance with the present invention.
Figure 2:
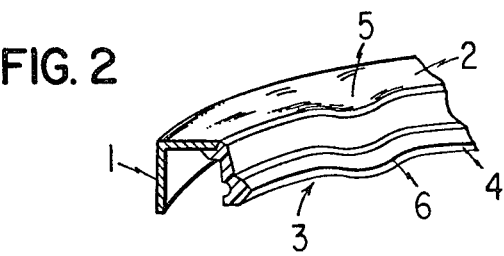
FIG. 2 is a partially perspective view of the oilseal shown in FIG. 1.

The present invention will be better understood from the following detailed description in conjuncton with the accompanying drawings which picture embodiments of the invention by way of illustration.

A metallic ring 1 for reinforcing the oilseal has an angular cross section and also a flange 2 projecting inwardly in a direction of its diameter. At the internal edge section of the flange 2 is an oilseal main body 3 made of a proper resilient material, such as synthetic rubber, bonded integrally therewith at the time of vulcanization molding of the oilseal main body 3. The oilseal main body 3 extends from the internal edge section of the flange 2 of the metallic ring 1 generally parallel to the annular wall of the metallic ring 1, and has a lip 4 which is integrally formed and directed radially inwardly.

At the proper location in the flange 2 of the metallic ring 1 is provided a plastically deformed section 5 which functions to impart a wavy curvature section to a lip line 6 of the resilient oilseal main body 3.

In other words, the wavy curvature lip line 6 is formed by plastically deforming the flange 2 to form the deformed section 5. This plastically deformed section 5 can be deformed easily after the vulcanization molding of the oilseal main body 3, or after finish work on the lip line for those requiring such a finish work, by the use of a press machine 7 such as, for example, shown in FIG. 4.

The shaping method for forming plastically deformed sections 5 will now be explained.

Protruding portions 9 are first formed around a lower side periphery of the upper mold 8 to be placed in the press machine 7 while a groove section 11 is defined in the upper surface of a lower mold 10 so as to accommodate the metallic ring 1 thereinto. While the upper mold 8 and the lower mold 10 are placed in the press machine 7, the metallic ring 1 of the oilseal that has been vulcanization molded and subsequently subjected to finish work of the lip line 6 for those uses calling for such finish work, is fitted into the groove section 11 of the lower mold 10 so that the flange 2 thereof is away from mold 10. The upper mold 8 is lowered to press the flange 2 of the metallic ring 1 whereupon the flange 2 is plastically deformed by the protruding portions 9 of the upper mold 8, imparting a curvature section to the lip line 6 of the oilseal main body 3.

Figure 3:
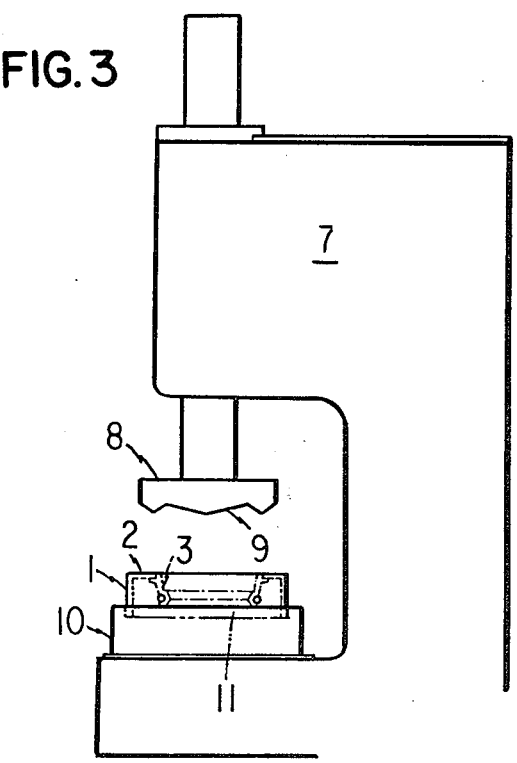
FIG. 3 is a schematic-side elevation of a press machine to effect plastic deformation of the oilseal shown in FIG. 1.

The above-described operation relates to a case where the flange 2 of the metallic ring 1 is plastically deformed by the protruding portion 9 defined only on the upper mold 8. Needless to say, another protruding portion 12 may likewise be defined on the upper surface section of the lower mold 10 commensurate with the protruding portion 9 of the upper mold 8 as shown in FIG. 4 so that these protruding portions 9, 12 clamp and cause plastic deformation of the flange 2 of the metallic ring 1 in basically the same manner as in the case shown in FIG. 3.

Alternatively as shown in FIG. 5, a plurality of pin-like projecting rods 13 may be provided with proper intervals therebetween around the lower periphery of the upper mold 8 in place of the protruding portions 9, 12, to cause plastic deformation of the flange 2 of the metallic ring 1.

Figure 6:
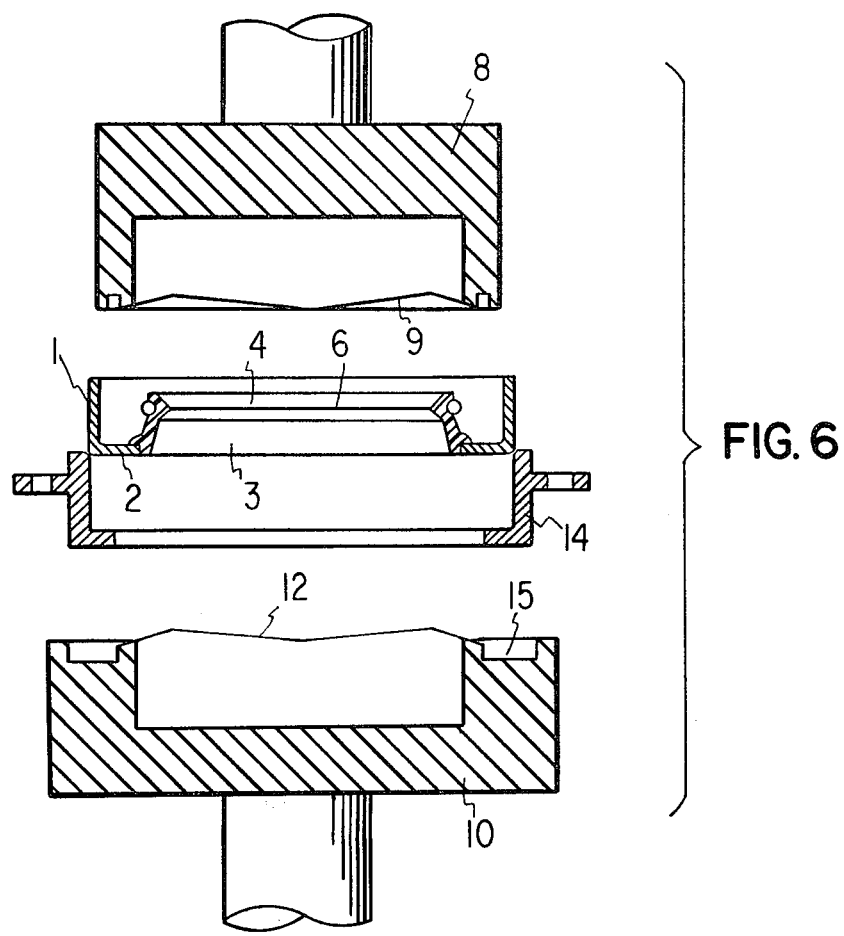

Plastic deformation of the flange 2 of the metallic ring 1 as noted in the foregoing paragraphs can also be effected at such occasions when a seal ring consisting of the metallic ring 1 and the oilseal main body 3 is incorporated into a device, or after the seal ring is already built in the device. Typical of this procedure is given with reference to FIG. 6.

An annular groove 15 is first defined so that a seal housing 14, as an example of a device, is fitted at a position in the proximity of the outside of the annular wall at the upper edge of which is provided the protruding portions 12 as seen in FIG. 4. After the seal housing 14 is fitted into the annular groove 15 and the seal ring is placed concentrically thereon, the upper mold 8 is then lowered. In this instance, the metallic ring 1 is press-fitted and thereby incorporated into the seal housing 14 whereupon the flange 2 of the metallic ring 1 is simultaneously plastically deformed.

Plastic deformation of the flange can naturally be effected in a situation when the metallic ring 1 has already been incorporated in the seal housing 14. It goes without special noting that plastic deformation of the flange 2 is not necessarily limited to the use of the press machine 7, but can also be carried out by means of a clamping jig and the like which has the protrution portions 9, 12 or the projecting rod sections 13.

The curvature section imparted by the plastic deformation of the flange 2 to the lip line 6 of the oilseal main body 3 may have a continuous sinosoidal or an irregular curve having different curvatures locally. The curvature section may also be disposed locally to the lip line 6.

Figure 7:
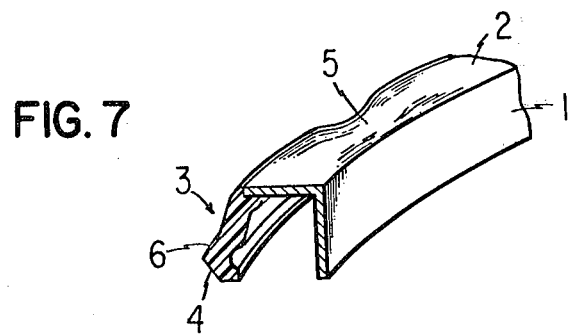
FIG. 7 is a partially perspective view of an oilseal deformed in accordance with this invention.

In the embodiment theretofore described, the oilseal main body 3 is attached to the internal edge of the flange 2 which projects radially inwardly. However, the oilseal main body 3 may also be fitted to the external edge of the flange 2 which projects radially outwardly in a direction from the metallic ring 1 as shown in FIG. 7. In this case, the oilseal main body 3 is integrally secured to the flange 2 at the time of vulcanization molding. The plastically deformed section 5 is formed on the flange 2 wherein the edge line 6 of the lip 4 is given a curvature section and faces radially outwardly.

As has so far been noted, in accordance with the present invention, a plastically deformed section is formed on a flange projecting radially inwardly or outwardly from the metallic ring, and the flange has a main body housing a lip integrally attached to it. The plastic deformation inevitably imparts a curvature section to the lip line of the oilseal main body.

1. A method of producing an oilseal comprising the steps of:
   providing a metallic ring having a flange projecting in the direction of the diameter of the ring;
   providing a resilient oilseal main body having a lip, the surface of which generates a lip line;
   integrally molding said oilseal main body to the edge of said flange; then plastically deforming at least one portion of said flange so as to impart a curvature section to the lip line.

2. The method as claimed in claim 1 wherein a plurality of deformed portions of the flange are simultaneously formed.

3. The method as claimed in claim 1 wherein said flange extends radially inwardly.

4. The method as claimed in claim 1 wherein said flange extends radially outwardly.

5. The method as claimed in claim 1 comprising the further step of positioning said integrally molded oilseal on a seal housing so that when the flange is plastically deformed the oilseal is also press-fitted into said seal housing.

* * * * *